United States Patent [19]

Martin

[11] Patent Number: 4,815,285
[45] Date of Patent: Mar. 28, 1989

[54] GAS TURBINE ENGINE BLEED CONTROL SYSTEM

[75] Inventor: Peter D. Martin, St. Louis County, Mo.

[73] Assignee: Engineered Air Systems, Inc., St. Louis, Mo.

[21] Appl. No.: 23,816

[22] Filed: Mar. 9, 1987

[51] Int. Cl.[4] ............................................. F02C 9/18
[52] U.S. Cl. ........................................ 60/39.29; 415/27
[58] Field of Search ........................ 60/39.07, 39.29; 415/27, 28

[56] References Cited

U.S. PATENT DOCUMENTS

| | | | |
|---|---|---|---|
| 2,732,125 | 1/1956 | Ruby | 415/27 |
| 3,809,490 | 5/1974 | Harner | 415/28 |
| 4,251,985 | 2/1981 | Sullivan | 415/27 |
| 4,300,587 | 11/1981 | Daeschner | 415/27 |
| 4,574,585 | 3/1986 | Conn | 415/27 |
| 4,671,318 | 6/1987 | Benson | 60/39.07 |

Primary Examiner—Louis J. Casaregola
Attorney, Agent, or Firm—Ralph B. Brick

[57] ABSTRACT

Apparatus for controlling bleed gas in the bleed gas system of a compressor for gas turbine engine wherein a valve disposed in the bleed conduit of a compressor is moved from closed to open position in a selectively controlled manner in accordance with a preselected bleed gas pressure sensed in the bleed gas system of the compressor.

6 Claims, 2 Drawing Sheets

GAS TURBINE ENGINE BLEED CONTROL SYSTEM

BACKGROUND OF THE INVENTION

The present invention relates to gas turbine engines and more particularly to a unique arrangement for controlling bleed gas in the bleed gas system of a compressor for a gas turbine engine.

A number of control devices have been utilized in the gas turbine engine art which have involved controlling discharge from the compressor means of the engine. These past control devices have been comparatively complex in manufacture, assembly and operation requiring expensive parts and labor and often failing to accomplish the purposes for which intended, further requiring special designs of complex signals and concomitant equipment dependent upon scheduled functions of engine speed, acceleration, deceleration, air feed, throttle position, engine operating temperature and fuel control rate transients. Such arrangements can be found in U. S. Pat. Nos. 3,006,145, issued to A. J. Sobey on Oct. 31, 1961; No. 3,025,668, issued to F. C. Mock on Mar. 20, 1962; No. 3,584,459, issued to Charles A. Amann on June 15, 1971; No. 3,780,528, issued to K. Brandenburg on Dec. 25, 1973; and, No. 3,902,316, issued to Louis W. Huellmantel on Sep. 2, 1975.

The present invention provides a unique and novel gas turbine engine bleed system which is comparatively straightforward, efficient and inexpensive in manufacture, assembly and operation, requiring a minimum of operating parts yet allowing for ready control of the fuel/air ratio to the gas turbine combustion system. In addition, the present inventive structure minimizes compressor stall and combustion chamber hammer, providing surge suppression and smooth acceleration and deceleration of the turbine engine.

Various other features of the present invention will become obvious to one skilled in the art upon reading the disclosure herein.

BRIEF SUMMARY OF THE INVENTION

More particularly the present invention provides apparatus for controlling bleed gas in the bleed gas system of a compressor for a gas turbine engine comprising a bleed valve disposed in the bleed system to control bleed gas flow from the compressor; valve operating means connected to the bleed valve to operate the bleed valve to regulate bleed gas flow and compressor gas pressure; and control means connected to the valve operating means, the control means being responsive to a preselected pressure level in the compressor gas pressure to actuate the valve operating means and regulate the bleed valve means. In addition, the present invention provides a unique arrangement for maintaining the bleed valve means in a normally closed position and for throttling the bleed valve speed upon opening and closing of the valve means.

It is to be understood that various changes can be made by one skilled in the art in the several parts of the apparatus disclosed herein without departing from the scope or spirit of the invention.

BRIEF DESCRIPTION OF THE DRAWINGS

Referring to the drawings which disclose one advantageous embodiment of the present invention.

DETAILED DESCRIPTION OF THE DRAWINGS

Figure 1:
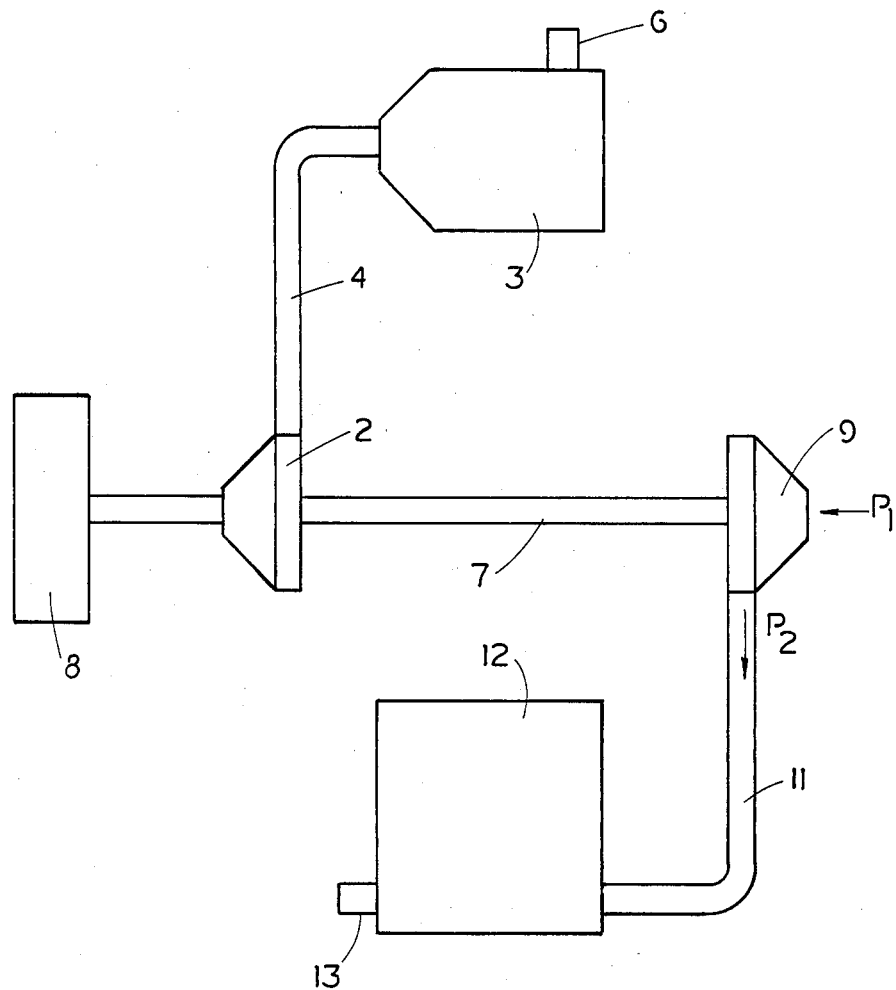
FIG. 1 is a schematic diagram of the novel gas turbine engine bleed control system in block form in an assembly arrangement with a typical combustor, turbine, load and compressor; and, FIG. 2 is an enlarged, partially broken away schematic view of the gas turbine bleed control system disclosed in block form in FIG. 1.

Referring to FIG. 1 of the drawings, gas turbine engine 2 is schematically disclosed as connected to combustor 3 by a suitable gas duct 4, combustor 3 having an appropriate fuel inlet 6. A rotatable shaft 7 extending through gas turbine engine 2 is connected at one end to a suitable load 8, such as but not limited to an electric generator, and at the other end to compressor 9 into which ambient air or gas $P_1$ can be introduced and from which bleed air or gas $P_2$ can be taken. Bleed gas $P_2$ is passed by primary bleed conduit 11 into bleed control system 12 having gas outlet 13.

Figure 2:
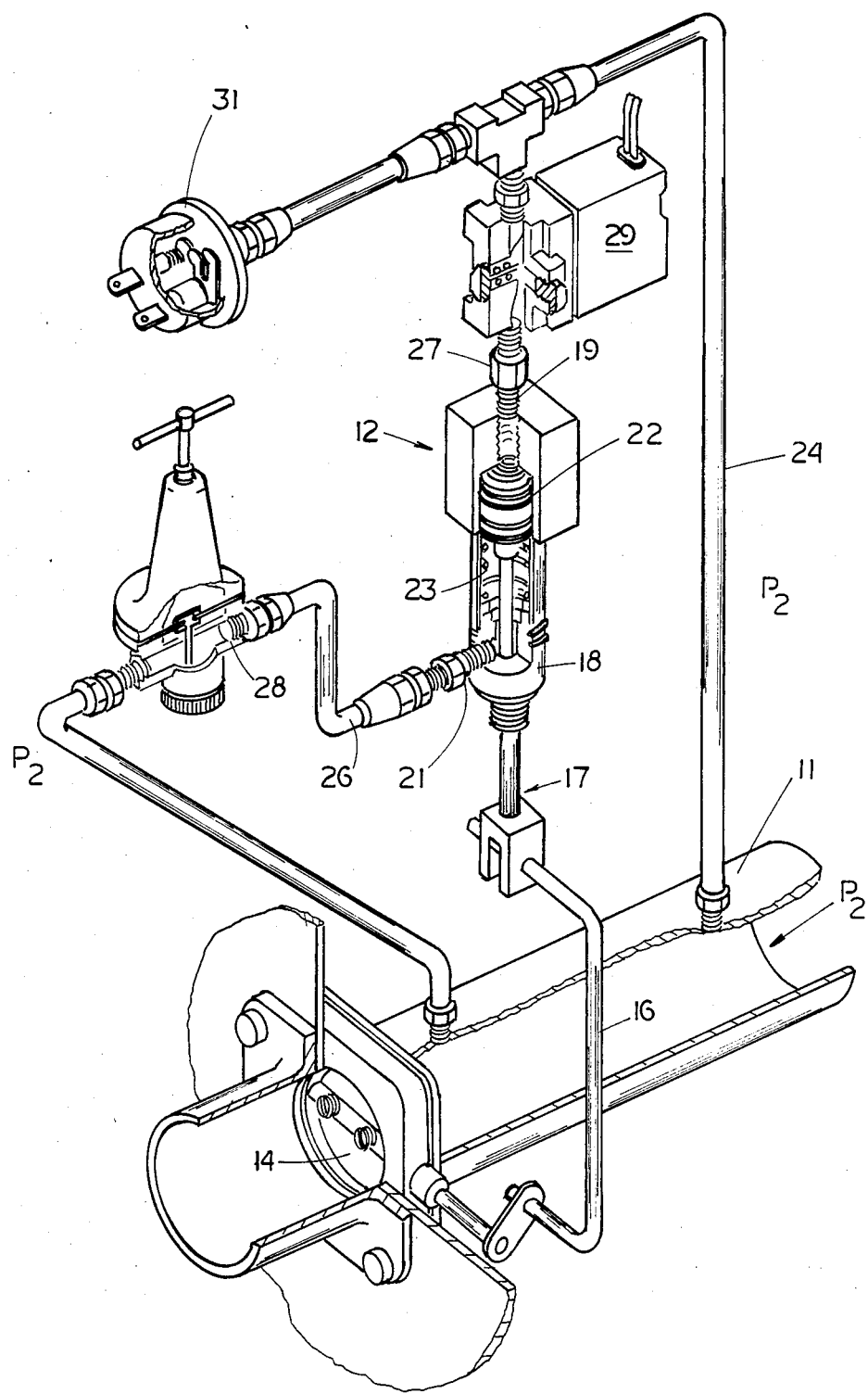

Referring to enlarged FIG. 2 of the drawings, bleed control system 12 is disclosed as including a butterfly valve 14 disposed in the primary bleed conduit 11 leading from compressor 9, this butterfly valve 14 serving to control the amount of bleed gas from compressor 9.

Connected to butterfly valve 14 by suitable crank arm and linkage assembly 16 is reciprocable piston linkage assembly 17 of gas sealed cylinder 18 having gas inlets 19 and 21 located at opposite ends thereof. The end of piston linkage assembly 17 opposite that end connected to crank arm and linkage assembly 16 communicates with gas inlet 19 adjacent piston top 22 disposed in cylinder 18 communicating with gas inlet 19. It is to be noted that a suitable helically coiled spring 23 is disposed in cylinder 18, the spring 23 biasing piston linkage assembly 17 and thus butterfly bleed valve 14 connected thereto to normally closed position.

Opposed gas inlets 19 and 21 of cylinder 18 are connected to a pair of secondary conduits 24 and 26 respectively which are, in turn, connected to primary bleed conduit 11. Secondary conduit 24 is provided with a suitable throttling orifice 27 and secondary conduit 26 is provided with a suitable throttling orifice 28. These throttling orifices 27 and 28 which can be fixed straight edge orifices of predetermined size or finite adjustable needle valves adjusted to operate at optimized machine performance serve to control and regulate the amount of pressure difference on opposite sides of piston 22 and thus the the speed of opening and closing respectively of butterfly valve 14 in primary conduit 11. It is to be understood that any one of several types of throttling devices known in the art can be utilized in secondary conduits 24 and 26 and details of the throttling orifices 27 and 28 are not described herein, such equipment being obtainable on a commercial basis from suppliers such as the NuPro Company of Willoughby, Ohio.

Included in secondary conduit 24 upstream of throttling orifice 27 is solenoid operated gas flow control valve 29. Like throttling orifices 27 and 28, any one of several types of three-way solenoid control valves designed to accept required temperature and pressure differentials can be utilized and details are also not described herein, such equipment being commercially available from commercial suppliers such as the MAC Valve Company of Wixom, Michigan. Solenoid control valve 29 is operated through a suitable gas pressure switch 31 which responds to a preselected pressure level in the bleed gas conduit 24 to actuate the switch and move solenoid controlled gas flow control valve 29 to gas flow position, thus moving normally closed butterfly valve 14 to open position controlling the amount of bleed gas from compressor 9.

It is to be understood that any one of several commercially available gas pressure switches or switches selected on the basis of predetermined temperature and current characteristics can be utilized, such switches being available from commercial suppliers such as the Hobbs Division of Stewart-Warner of Springfield, Illinois.

It is further to be understood that if desired, suitable temperature responsive devices can be selectively utilized instead of pressure responsive devices to control the amount of bleed gas to be bled from compressor 9.

The invention claimed is:

1. Apparatus for controlling bleed gas in the bleed system of a compressor for a gas turbine engine comprising:

a bleed valve disposed in said bleed system to control bleed gas flow from said compressor;

valve operating means including spaced throttling orifices connected to said bleed system and a valve actuator connected between said orifices to be actuated by differential pressure between said throttling orifices, said valve actuator being connected to said bleed valve to operate said bleed valve when actuated to regulate bleed gas flow and compressor gas pressure; and, control means connected to said valve operating means, said control means being responsive to a preselected physical criteria level in said bleed system to actuate said valve operating means and regulate said bleed valve means, said control means including a switch member responsive to a preselected pressure level in said bleed gas system and a gas flow control valve actuable by said switch member to control bleed gas flow to said valve operating means.

2. The apparatus for controlling bleed gas of claim 1, said throttling orifices serving to control the actuating speed of said valve operating means in accordance with acceleration and deceleration of said gas turbine engine.

3. The apparatus for controlling bleed gas of claim 1, including spring means to urge said bleed valve in normally closed position in the event of gas pressure failure.

4. The apparatus for controlling bleed gas of claim 1, said control means being operable by a bleed gas pressure criteria.

5. Apparatus for controlling bleed gas in the bleed system of a compressor for a gas turbine engine comprising:

a bleed valve disposed in said bleed system to control bleed gas flow from said compressor;

valve operating means including spaced throttling orifices connected to said bleed system and a valve actuator connected between said orifices to be actuated by differential pressure between said throttling orifices, said valve actuator being connected to said bleed valve to operate said bleed valve when actuated to regulate bleed gas flow and compressor gas pressure; said valve actuator including a gas sealed cylinder with a piston slideably disposed therein having one end thereof linked to said bleed valve and the opposite end communicating with a cylinder inlet connected to a pressure responsive switch and gas flow control valve in said control means, said switch being responsive to a preselected pressure level in said bleed system to cause bleed gas to flow through said control valve and through one of said spaced throttling orifices into said cylinder and actuate said piston to move said bleed valve from closed to open position; and control means connected to said valve operating means, said control means being responsive to a preselected physical criteria level in said bleed system to actuate said valve operating means and regulate said bleed valve means.

6. Apparatus for controlling bleed gas in the bleed system of a compressor for a gas turbine engine comprising:

a main bleed conduit connected to said compressor to receive bleed gas from said compressor;

a butterfly valve disposed in said main bleed conduit;

a gas sealed cylinder having spaced first and second gas inlets at opposite ends thereof with a piston reciprocably disposed therebetween with one end thereof linked to said buterfly valve in said main bleed conduit; said cylinder having a spring disposed therein at the opposite end of said piston to normally move said piston to operatively close said butterfly bleed valve in said main bleed conduit; said main bleed conduit being communicatively connected to corresponding ends of a pair of secondary conduits with the opposite ends of said secondary conduits being communicatively connected to said first and second gas inlets of said piston chamber, said secondary conduits having throttling orifices to modulate and regulate gas flow into said chamber on opposite faces of said piston providing a differential pressure thereacross regulated to modulate the speed of movement of said piston in said chamber; said secondary conduit connected to said first gas inlet of said piston chamber having a gas flow control valve disposed therein; and, a pressure switch responsive to a preselected pressure of said bleed gas to move said gas flow control valve to gas flow position.

* * * * *